Jan. 14, 1930.                R. STEIN                1,743,991
                          BRAKE MECHANISM
                         Filed Jan. 3, 1928
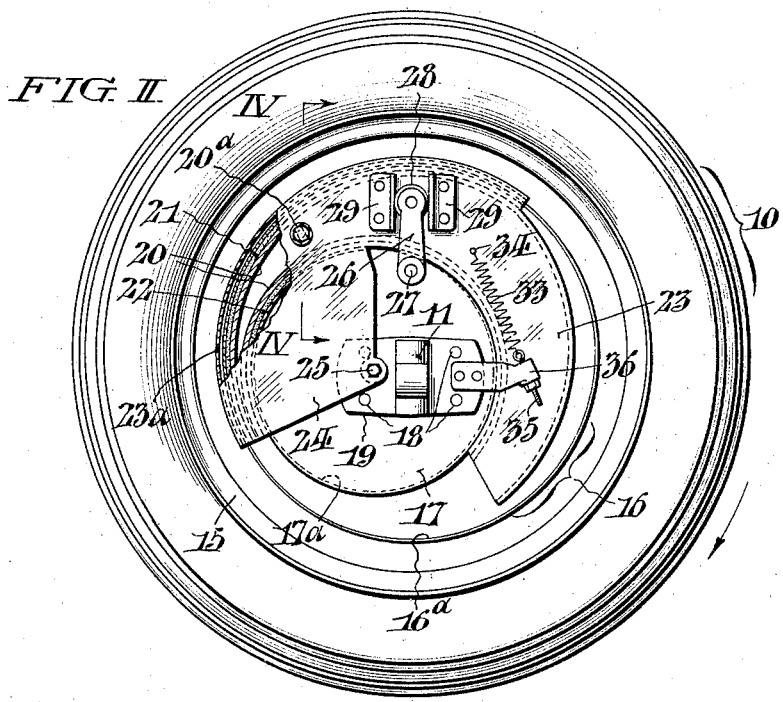
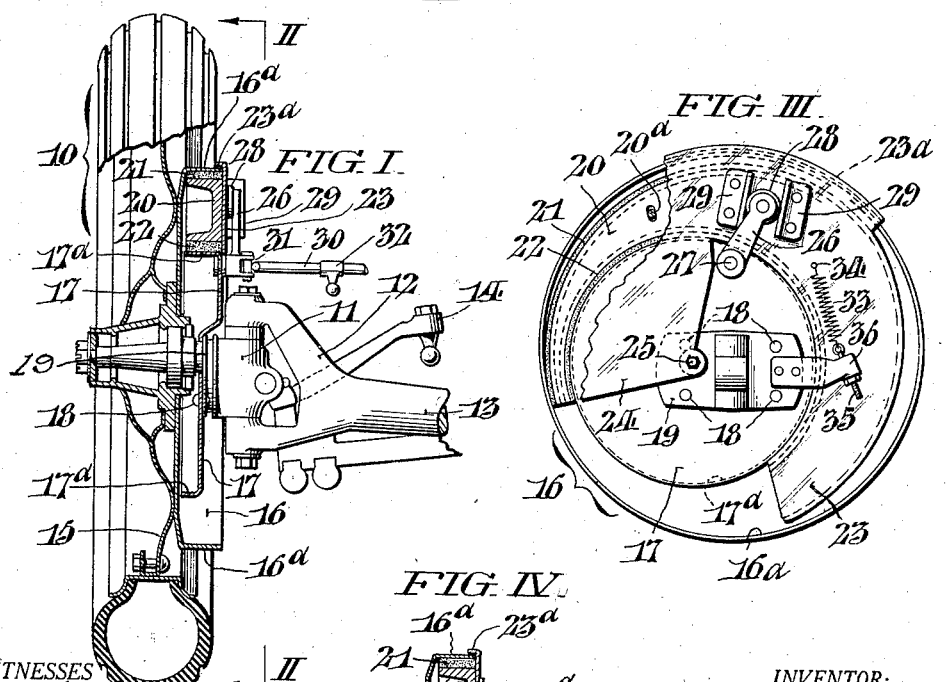
WITNESSES
John C. Bergner
Thomas W. Kerr Jr.
INVENTOR:
Raphael Stein,
BY Fraley Paul
ATTORNEYS.

Patented Jan. 14, 1930

1,743,991

UNITED STATES PATENT OFFICE

RAPHAEL STEIN, OF PHILADELPHIA, PENNSYLVANIA, ASSIGNOR OF ONE-HALF TO DAVID T. BERLIZHEIMER, OF PHILADELPHIA, PENNSYLVANIA

BRAKE MECHANISM

Application filed January 3, 1928. Serial No. 244,138.

This invention relates to brake mechanism useful in various connections, more particularly with vehicles such as automobiles.

My invention is directed toward provision of brake mechanism which is devoid of complication; which is inexpensive to construct; which is absolutely reliable and effective in operation; which, after initial assembling, never requires adjustment; and which—as regards the specific use above referred to—is easily dismantled for convenience in renewing the brake linings; and which withal is adaptable to both the steering and driving wheels of the vehicle.

How the foregoing as well as other advantages may be readily realized in actual practice will be manifest from the detailed description which follows of the typical embodiment of this invention shown in the drawings, whereof Fig. I is a fragmentary illustration, partly in elevation and partly in section, of the front axle and one of the steering wheels of an automobile equipped with my improved brake mechanism.

Fig. II is a section taken as indicated by the arrows II—II in Fig. I, showing the brake mechanism in active position.

Fig. III is a view similar to Fig. II with the steering wheel omitted, but showing the brake mechanism in the released position; and, Fig. IV is a detail sectional view taken as indicated by the arrows IV—IV in Fig. II.

With more detailed reference to these illustrations, 10 designates, comprehensively, one of the forward or steering wheels of a motor vehicle; 11, the wheel spindle member which is pivotally connected for horizontal oscillation in the usual manner, within a bifurcation 12 at the corresponding end of the front axle, whereof a portion is shown at 13 in Fig. I; and 14, is the steering arm for swinging the spindle member. The wheel 10 herein illustrated is of the solid or metallic disc type; but it will be apparent from further description that the braking mechanism of my invention is equally adaptable to artillery wheels, as well as to those of the wire spoked variety.

Attached in concentric relation to the disc 15, of the wheel 10, by riveting or welding, is a brake drum 16 with an inwardly-directed circumferential flange 16ª. An associated smaller inner drum 17 is eccentrically-disposed within the drum 16 and has its circumferential flange 17ª directed oppositely to that of the drum 16. As shown in Figs. I and II, the drum 17 is fixedly secured, by rivets 18, to the outer face of a plate 19 which may be rigidly attached to, or integrally formed with the spindle member 11, as found most desirable or expedient in practice. The crescent-shaped interval between the two interlapping drums 16, 17 is occupied by a braking member in the form of a wedge shaped shoe 20 having, as shown in Figs. I and IV, a channelled cross section. From Figs. II and III it is to be particularly observed that the external and internal braking faces of the shoe 20 contiguous to the drum flanges 16ª, 17ª are of the same linear extent and area; and, as conventionally indicated at 21, 22, are covered with renewable lining material such as is customarily employed in this art. From Fig. III it will be further noted that the brake shoe 20 is floatingly supported on a single stud 20ª afforded by a carrier 23 fashioned in the present instance, from stout sheet metal with an outer edge flange 23ª to overlap the flange 16ª of the drum 16, the hole for passage of the stud 20ª in the shoe 20 being somewhat elongated in a radial direction to enable pressing of the latter against the inner or fixed drum 17 as later explained. The carrier 23 is extended inwardly as at 24 for pivotal attachment to a stud 25 projecting laterally from the rear of the face plate 19 in line with the axis of the inner or fixed drum 17. Movement of the carrier 23 about the stud 25 in applying the brake is effected through the medium of an arm 26 which is swingable on a stud 27 with anchorage in the back of the fixed drum 17, said arm carrying at its outer end a roller 28 to engage between opposing guide pieces 29 on the carrier 23. Suitable connections may be provided for actuating the arm 26 from the driver's seat of the vehicle. These may include a shaft 30 coupled to said arm through a universal joint at 31 (to permit steering movement of the wheel 10) and equipped with a lever arm 32. All other coordinated parts may be of any suitable design and are omitted from the drawings since they are not directly pertinent to the present invention. A helical tension spring 33 attached at one end to a stud 34 on the carrier 23 and connected at the other end to an eye bolt 35, with capacity for adjustment in an arm 36 reaching from the plate 19 on the spindle member 11, serves to normally hold the brake shoe 20 in the inactive position of Fig. III, i. e. free from contact with the flange 16ª of the drum 16.

The operation of my invention is as follows: To arrest motion of the wheel 10, which during forward travel of the vehicle rotates in the direction of the arrow shown in Fig. II, the actuating arm 26 is moved counter-clockwise about the stud 27 from the normal position of Fig. III to that shown in Fig. II, such movement being communicated, through cooperation of the roller 28 on said arm with the guides 29, to the carrier 23, to the end that the same is swung about the axis 25. The brake shoe 20, in following suit is wedged between the drums 16, 17. Incidental to the movement induced as just explained, the shoe 20 is, obviously, free to adjust itself positionally with relation to the two drums 16, 17 by virtue of the slotted connection with the stud 20ª so that the facing material 21, 22 bears evenly against the flanges 16ª, 17ª, of said drums to effectively oppose rotation of the wheel 10. Since the areas of the shoe 20 which contact with the drums 16, 17 are exactly the same, the braking action is obviously not attended by unequal strain on the parts directly involved. In view of the fact that the braking movement of the shoe 20 is counter to the rotation of the wheel 10 during forward travel of the vehicle, the possibility of jamming incidental to sudden application at high speeds is entirely precluded. Moreover, upon release of the braking mechanism, the spring 33 acts to retract the brake shoe 20 to the inactive position of Fig. III, the action being assisted through rotation of the wheel 10 in the direction indicated. A further noteworthy feature of my invention resides in the fact that the braking shoe 20 embraces considerably more than half the circumference of the smaller drum 17 and is thereby effectively held against rattling when in the normal or released position.

When it becomes necessary to remove the brake shoe 20 for the purpose of relining, this may be easily accomplished simply by taking off the wheel 10 to expose said shoe, and thereupon unscrewing the bolt 20ª to release it. After relining, the shoe 20 is replaced by a similar procedure, in the reverse order, without necessity for readjustment of any of the parts.

Although I have shown but a single bolt 20ª for attaching the brake shoe 20 to its carrier 23, obviously such bolts may be duplicated if desired or required at intervals around said shoe.

The adaptation of the brake mechanism of my invention to the driving wheels of the vehicle is thought to be obvious without requiring special illustration or description other than to mention that the inner drum 17 is directly fixed to the rear axle in such cases.

Having thus described my invention, I claim:

1. Brake mechanism comprising a fixed and a revolving drum, and a wedge member having braking surfaces of substantially the same area, capable of being brought into equal pressure contact with both drums at the same time.

2. Brake mechanism comprising a fixed and a revolving drum, one within the other, and a wedge member having eccentric surfaces of corresponding area in the intervening interval capable of being brought into and applying equal braking pressure contact to both drums at the same time.

3. Braking mechanism comprising a fixed and a revolving drum in eccentric relation, and a wedge member having eccentric surfaces of the same area capable of being brought into and applying equal pressure contact to both drums at the same time.

4. Brake mechanism comprising a fixed and a revolving drum, one eccentrically within the other, and a wedge member having eccentric surfaces of the same area in the intervening interval capable of being brought into and applying equal pressure contact to both drums at the same time.

5. Brake mechanism comprising a revolving drum, a fixed drum eccentrically within the revolving drum, and a wedge member having eccentric surfaces of the same area in the intervening interval capable of being brought into and applying equal pressure contact to both drums at the same time.

6. Brake mechanism comprising a fixed and a revolving drum, one eccentrically within the other, and a wedge shaped member having eccentric surfaces of the same linear extent and area in the intervening interval capable of being moved to bring its external and internal surfaces into and thereby applying equal braking pressure to both drums at the same time.

7. Brake mechanism comprising a fixed and a revolving drum, and a braking member having eccentric surfaces of the same linear extent and area adapted to contact over similar areas of both drums at the same time.

8. Braking mechanism comprising a fixed and a revolving drum, one eccentrically within the other, and a braking member having eccentric surfaces of the same linear extent and area in the intervening interval adapted to make contact with both drums at the same time over equal areas.

9. Braking mechanism comprising a fixed and a revolving drum one eccentrically within the other, a wedge shaped braking member having eccentric surfaces of the same linear extent and area in the intervening interval, and means to move the braking member from a normal inactive position to active position with the eccentric surfaces thereof in pressure contact with and thereby apply equal braking pressure to both drums at the same time.

10. Braking mechanism comprising a fixed and a rotating drum, one eccentrically within the other, a wedge braking member having eccentric surfaces of the same linear extent and area in the intervening interval, means to floatingly support the braking member normally out of contact with the moving drum, and means for moving the support to bring the braking member into pressure contact with and thereby apply equal braking pressure to both drums at the same time.

11. Braking mechanism comprising a rotating drum, a fixed drum eccentrically within said rotating drum, a wedge shaped braking member in the intervening interval, a carrier to floatingly support the braking member normally free of contact with the rotating drum, said carrier being swingable about the axis of the fixed drum, and means for actuating the carrier to bring the braking member into active position with its external and internal faces in pressure contact with both drums at the same time.

12. Braking mechanism comprising a rotating drum, a fixed drum eccentrically within the rotating drum, a wedge braking member in the interval between the drums, a carrier to floatingly support the braking member normally out of contact with the rotating drum, said carrier being swingable about the axis of the fixed drum, and means for actuating the carrier to bring the external and internal faces of the braking member into pressure contact with both drums at the same time, such actuating means comprising an arm with fulcrum bearing on the fixed drum and carrying at its free end a roller to engage between guides on the carrier.

13. Braking mechanism comprising a fixed and a rotating drum one eccentrically within the other, a wedge braking member having eccentric surfaces of the same linear extent and area in the intervening interval normally out of contact with the rotating drum, and means for moving the braking member in a direction counter to that of the revolving drum into and thereby apply equal braking pressure to both drums at the same time.

14. Braking mechanism for vehicles comprising a drum secured to and revolving with the vehicle wheel, a fixedly-supported associated drum, a braking member having eccentric surfaces of the same linear extent and area capable of being brought into and thereby apply equal braking pressure to both drums at the same time, and means to actuate said braking member.

15. Braking mechanism for vehicles comprising a drum secured to and revolving with the vehicle wheel, a fixedly-supported associated drum, a braking member having eccentric braking faces of the same linear extent and area capable of being brought into and thereby apply equal braking pressure to both drums at the same time, and means to actuate said braking member.

16. Braking mechanism for vehicles comprising a drum secured to and revolving with the vehicle wheel, and associated drum fixedly supported in eccentric relation within the rotating drum, a wedge braking member having eccentric surfaces of the same linear extent and area in the interval between the drums, and means for moving said braking member into and thereby to apply equal pressure to both drums at the same time.

17. Braking mechanism for the steering wheels of vehicles comprising a drum secured to and revolving with the steering wheel, an associated drum fixedly supported by the wheel spindle member, a braking member having eccentric surfaces of the same linear extent and area adapted to engage both drums at the same time, and means for actuating the braking member, said means having interposed universal connections to permit the steering movement of the wheel.

18. Braking mechanism for the steering wheels of vehicles comprising a drum secured to and revolving with the steering wheel, an associated drum fixedly supported by the wheel spindle member in eccentric relation within the rotating drum, a wedge braking member having eccentric surfaces of the same linear extent and area in the interval between the drums, and means for moving said member into and thereby to apply equal braking pressure to both drums at the same time, said means having interposed universal connections to permit the steering movement of the wheel.

19. Braking mechanism for vehicles comprising a drum secured to and revolving with the vehicle wheel, an associated drum fixedly supported independently of the wheel in eccentric relation to the revolving drum, a wedge braking member in the interval between the drums and embracing more than half the circumference of the second mentioned drum so as to be normally held against rattling, a support to floatingly support the braking member out of contact with the rotating drum, and means for moving the support to bring the braking member into active position with its external and internal faces in pressure contact with both drums at the same time.

20. Braking mechanism for vehicles comprising a drum with an inwardly directed circumferential flange secured to and revolving with the vehicle wheel, a smaller fixed drum mounted on the wheel axle eccentrically within the revolving drum and having its circumferential flange outwardly directed, a wedge braking shoe floatingly supported in the interval between the drum flanges by removable bolts taking into a carrier with concentric pivotal connection at the back of the fixed drum, and means for moving the carrier to bring the external and internal braking faces of the shoe into pressure contact with the flanges of both drums at the same time.

In testimony whereof, I have hereunto signed my name, at Philadelphia, Pennsylvania, this 27th day of December, 1927.

RAPHAEL STEIN.